United States Patent
Stokes et al.

(10) Patent No.: US 7,605,823 B2
(45) Date of Patent: Oct. 20, 2009

(54) ICC CONSISTENT CHROMATIC ADAPTATION

(75) Inventors: Michael D. Stokes, Eagle, ID (US); Michael A. Bourgoin, Lake Forest Park, WA (US); Laurence J. Golding, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 11/159,731

(22) Filed: Jun. 23, 2005

(65) Prior Publication Data

US 2006/0290954 A1  Dec. 28, 2006

(51) Int. Cl.
G09G 5/02  (2006.01)
G06K 9/00  (2006.01)

(52) U.S. Cl. .................. 345/589; 345/600; 345/603; 345/604; 382/167

(58) Field of Classification Search .................. 345/589, 345/600, 603, 604; 382/167
See application file for complete search history.

(56) References Cited

U.S. PATENT DOCUMENTS

| | | | | |
|---|---|---|---|---|
| 6,459,425 | B1* | 10/2002 | Holub et al. | 345/207 |
| 6,462,748 | B1* | 10/2002 | Fushiki et al. | 345/604 |
| 6,504,950 | B1* | 1/2003 | Murashita et al. | 382/162 |
| 6,603,483 | B1* | 8/2003 | Newman | 345/593 |
| 6,791,716 | B1* | 9/2004 | Buhr et al. | 358/1.9 |
| 7,227,666 | B1* | 6/2007 | MacLeod | 358/1.9 |
| 2002/0003903 | A1* | 1/2002 | Engeldrum et al. | 382/233 |
| 2004/0228525 | A1* | 11/2004 | Krabbenhoft | 382/162 |
| 2005/0047684 | A1* | 3/2005 | Baum et al. | 382/311 |
| 2005/0134879 | A1* | 6/2005 | Fuchs et al. | 358/1.9 |
| 2005/0225784 | A1* | 10/2005 | Jacob et al. | 358/1.9 |
| 2005/0248786 | A1* | 11/2005 | Tobie et al. | 358/1.9 |
| 2005/0249403 | A1* | 11/2005 | Haikin | 382/162 |
| 2006/0007455 | A1* | 1/2006 | Bailey | 358/1.9 |

OTHER PUBLICATIONS

"Image Technology Colour Management—Architecture, Profile Format, and Data Structure", International Color Consortium Specification ICC.1:2004-10 (Profile version 4.2.0.0), 2004.
"A Colour Appearance Model for Colour Management Systesm: CIECAM02", Technical Report, CIE 159:2004, ISBN 3 901 906 29 0, Commission Internationale De L'Clairage, Austria.

* cited by examiner

Primary Examiner—Kimbinh T Nguyen
Assistant Examiner—David T Welch
(74) Attorney, Agent, or Firm—Shook, Hardy & Bacon LLP

(57) ABSTRACT

Systems and methods for providing consistent chromatic adaptation to a workflow comprising a number of International Color Consortium (ICC) profiles is provided. In accordance with an exemplary method of the present invention, the profiles within the workflow that require chromatic adaptation are identified. A control profile, whose chromatic adaptation method will be applied to the other profiles identified as requiring chromatic adaptation, is also identified. The chromatic adaptation method of the control profile is determined. The color data of the each profile identified as requiring chromatic adaptation is then converted using the chromatic adaptation method of the control profile such that all profiles requiring chromatic adaptation have been chromatically adapted using the same method.

17 Claims, 7 Drawing Sheets

ICC CONSISTENT CHROMATIC ADAPTATION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Different devices interpret and reproduce color differently and are often referred to as having disparate color spaces. As a result, the same document may look different on two separate devices unless the devices are alike and process the image data for the document identically. For example, a document displayed on a monitor may look different when displayed on a different monitor or printed on a printer. In order to compensate for the difference in the way devices interpret and reproduce color, color transformations may be applied to image data in order to convert the data from the color space of one device to a color space of another device. In other words, a color transformation maps the colors from a source color space to a destination color space such that the colors look similar when viewed on the source device and destination device.

Generally, there are two approaches to color transformation, device dependent color transformation and device independent color transformation. Device dependent color transformation entails providing transformations to convert data from each source device within a system to each destination device within the system. This requires each transformation to have both source device color information and destination device color information. In addition, for a system having n devices, $n^2$ transformations are required. Device independent color transformation involves providing a standard intermediate color space. A transformation is provided for each device to convert between the device color space and the standard intermediate color space. This type of system provides a number of benefits, including a reduction in the number of transformations required. For example, for a system having n devices, only n transforms are required.

The International Color Consortium (ICC) was developed to provide a standardized device independent color transformation system. The standard intermediate color space used in the ICC specification is called the profile connection space (PCS). Transformations for converting color data between a device color space and the PCS are provided in a device profile. Generally, a device profile is a file that contains parameters that define the color conversion between the device color space and the PCS. The profile comprises a header, a tag table, and tagged element data. The profile header provides information that allows the profile to be properly searched and sorted. The tag table operates as a table of contents for the tags and the tag element data in the profile. The tag element data contains the data for each tag.

The ICC specification has been periodically updated to address shortcomings of previous versions (the current version of the ICC specification is version 4.2, which is herein incorporation by reference in its entirety). One area in particular that has been recently addressed, beginning with version 4 (V4) of the ICC specification, is chromatic adaptation. Chromatic adaptation is the ability of the human visual system to adjust to different illumination sources to approximately maintain the appearance of an object's colors. For color transformation, chromatic adaptation takes into account that images from various devices may be subject to or assumed to be under different illumination.

Versions of the ICC specification prior to the V4 specification did not specify any requirement for chromatic adaptation. As a result, the chromatic adaptation applied to device color values could range from no adaptation to full adaptation with no information supplied to indicate what, if any, chromatic adaptation was applied. The V4 ICC specification addressed this issue by requiring color data for V4 profiles to be chromatically adapted to the PCS white point if chromatic adaptation is necessary (i.e. the device white point differs from the PCS white point). In addition, the V4 specification requires the chromatic adaptation matrix used to be included in a chromatic adaptation (chad) tag within the profile.

Although the V4 ICC specification attempted to address the inadequacies of previous versions' approaches to chromatic adaptation, the current specification falls short in providing an unambiguous and consistent approach. In particular, the V4 ICC specification does not mandate a particular chromatic adaptation method but, instead, provides the ability for each profile to have its own chromatic adaptation method. This can lead to different chromatic adaptation methods being applied within a single workflow, which is undefined science and was strongly recommended against by the original authors of the chromatic adaptation methods.

The current ICC specification attempts to address this problem by providing some guidance within Annex E of the specification. To address inconsistent chromatic adaptation, Annex E recommends using the inverse of the chromatic adaptation matrix for each profile (found in the chromatic adaptation tag) to "back out" the chromatic adaptation applied to each device's color data and then apply a consistent chromatic adaptation method to the color data for each device. However, the approach remains ambiguous and retains a number of shortcomings. In particular, the current ICC specification recommendations imply that the inverse chromatic adaptation matrix from each profile is used to derive the device white point, which may differ from the actual device white point used by that profile. Additionally, the current ICC specification does not provide any guidance on what chromatic adaptation method should be employed other than recommending use of the Bradford transform. However, it may be desirable to adopt the chromatic adaptation method employed by one of the profiles within the workflow. The ICC specification does not provide any guidance regarding which chromatic adaptation method should take priority.

Accordingly, an unambiguous approach to provide consistent chromatic adaptation for ICC workflows would be desirable. Additionally, the ability to support legacy profiles (i.e. versions prior to V4), V4 profiles, and profiles from future ICC specification versions would be advantageous. Further, it would be advantageous if the approach allowed flexibility for either a user or vendor to decide whether to opt into the approach and to also retain control of the chromatic adaptation applied to an ICC workflow.

BRIEF SUMMARY OF THE INVENTION

Embodiments of the present invention relate to systems and methods for providing consistent chromatic adaptation to a workflow containing a sequence of ICC profiles. Accordingly, in one aspect, an embodiment of the present invention is directed to a method for providing consistent chromatic adaptation for an ICC workflow. The method includes identifying ICC profiles within the workflow that require chromatic adaptation. The method also includes identifying one of the ICC profiles as a control profile and determining the chromatic adaptation method that is employed by the control profile. The method then further includes converting color data associated with each ICC profile identified as requiring chromatic adaptation using the chromatic adaptation method employed by the control profile.

In another aspect of the present invention, an embodiment is directed to a system for providing consistent chromatic adaptation for an ICC workflow. The system includes a profile identifying component, a control profile identifying component, a target determining component, and a conversion component. The profile identifying component is capable of identifying ICC profiles within the workflow that require chromatic adaptation. The control profile identifying component may identify one of the ICC profiles as a control profile. The target determining component is capable of determining a target cone matrix and target cone white points from the control profile. The conversion component is capable of converting color data for each ICC profile identified as requiring chromatic adaptation using the target cone matrix and target PCS cone white point.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
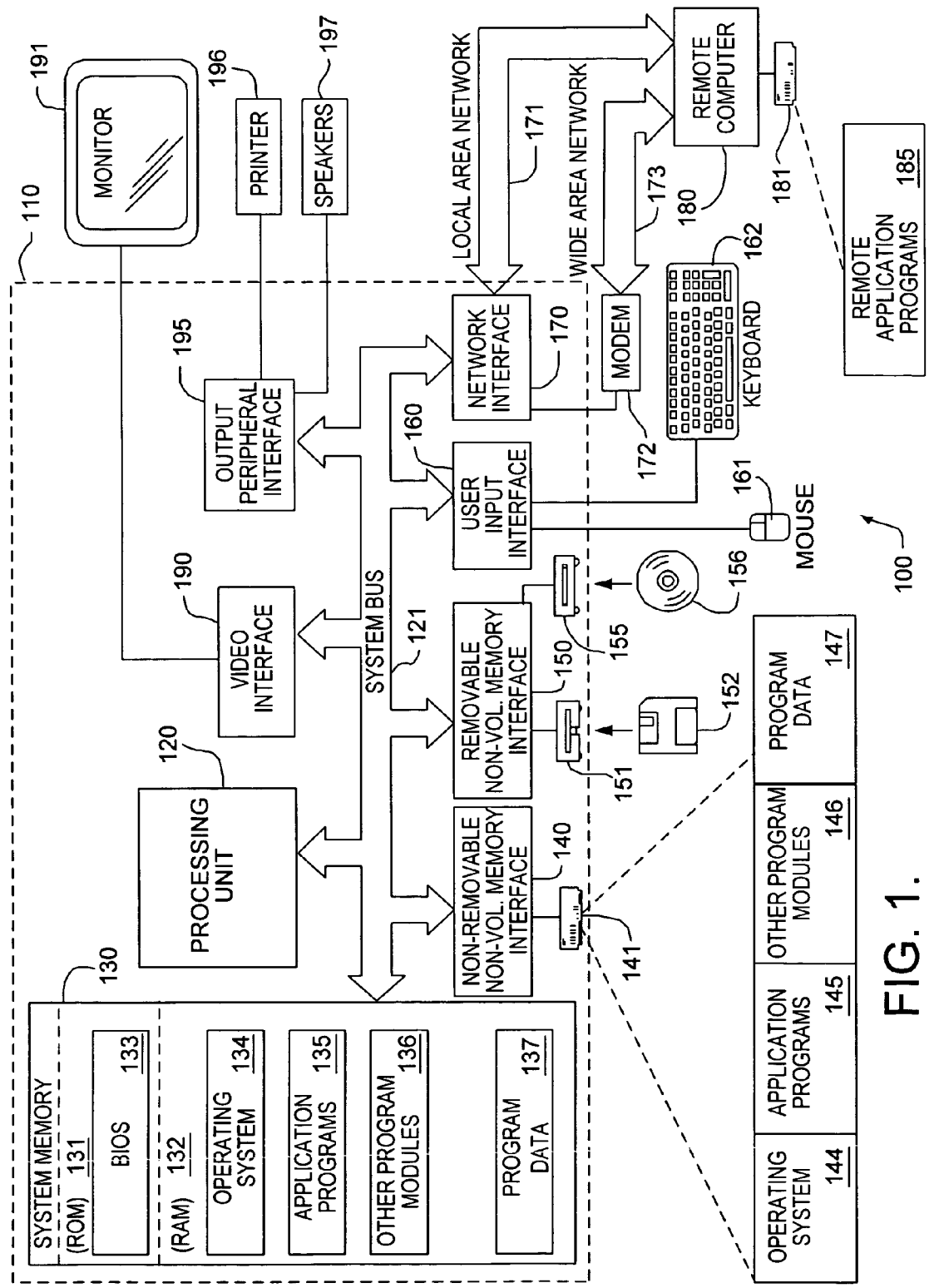
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems and methods for providing consistent chromatic adaptation to an ICC workflow containing a sequence of profiles. In accordance with an exemplary method of the present invention, profiles within the workflow that require chromatic adaptation are identified. In addition, one of the profiles is identified as a control profile. By selecting a control profile, the chromatic adaptation method in the control profile can be designated as the chromatic adaptation method to be applied to all profiles requiring chromatic adaptation to provide consistent chromatic adaptation within the workflow. The parameters needed to apply the chromatic adaptation method of the control profile to the other profiles are extracted from the control profile. In particular, these parameters include the cone matrix and cone white points, which are designated as the target cone matrix and target cone white points.

Color data associated with each profile identified as requiring chromatic adaptation may then be converted using the parameters extracted from the control profile such that the data for each profile has been chromatically adapted to the PCS using the same chromatic adaptation method. The process includes first "backing out" the chromatic adaptation applied to the color data associated with each profile and then applying the chromatic adaptation method of the control profile. Because the color data associated with each V4 profile has been chromatically adapted to the PCS using the chromatic adaptation method contained in each V4 profile, the color data for each V4 profile is first converted to the device source color space from the PCS by applying the inverse chromatic adaptation matrix from each V4 profile's chad tag. For V2 profiles, which do not have a chad tag, the Bradford matrix is assumed to be the chromatic adaptation method that was applied and is used to convert the data associated with each V2 profile from the PCS to the device source color space. A new chromatic adaptation matrix is then computed for each profile using the target cone matrix, the target PCS cone white point, and the device source cone white point associated with each profile. The new chromatic adaptation matrix computed for each profile is then applied to the color data associated with that profile to convert back to the PCS. By converting the color data for each profile in this way, the color data for all profiles requiring chromatic adaptation has been chromatically adapted to the PCS using a homogeneous chromatic adaptation method.

Having briefly described an overview of the present invention, an exemplary operating environment for the present invention is described below.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

As previously mentioned, embodiments of the present invention relate to systems and methods for providing consistent chromatic adaptation to an ICC workflow comprising a sequence of profiles that use inconsistent chromatic adaptation techniques.

Figure 2:
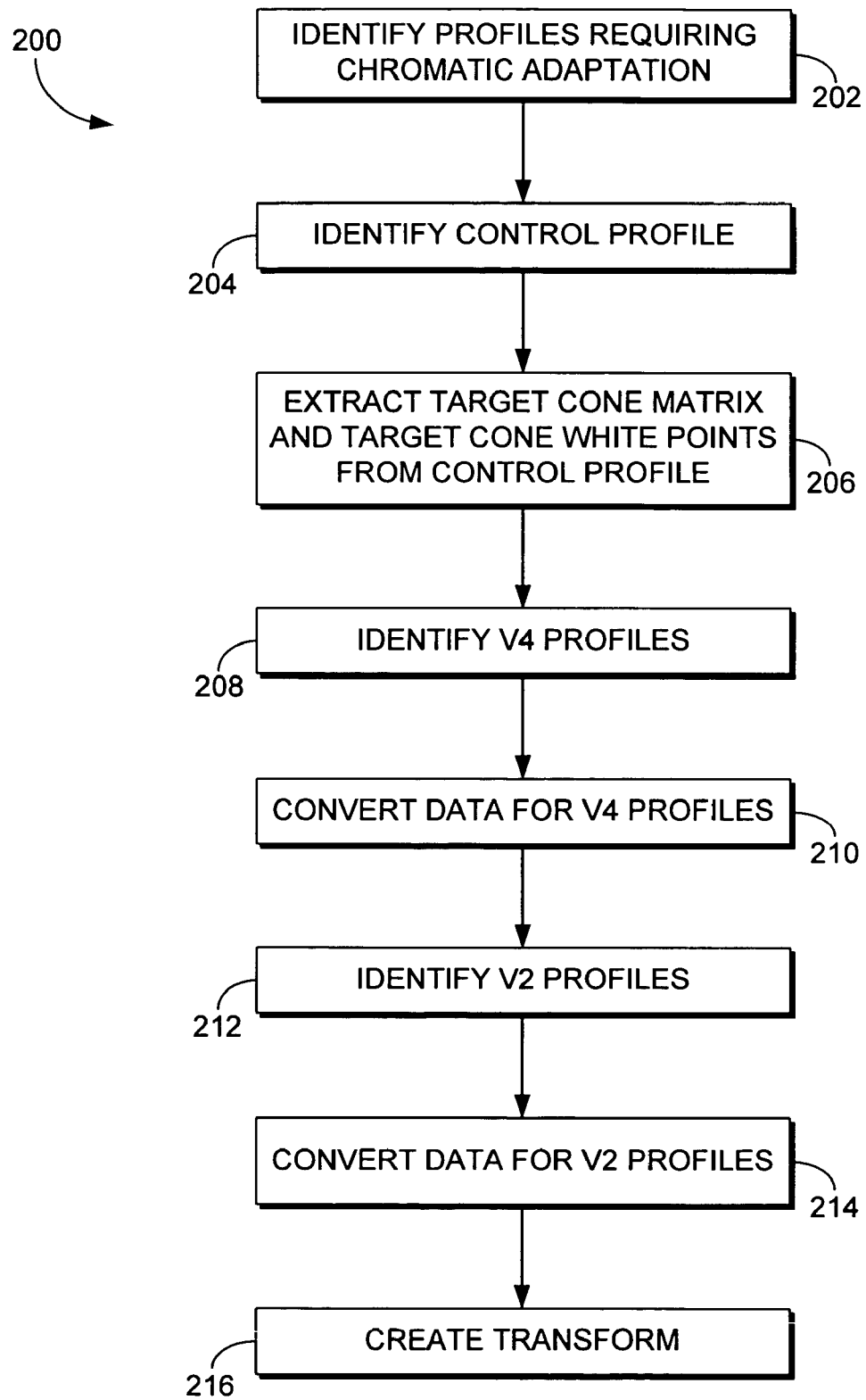
FIG. 2 is a flow diagram showing a method for providing consistent chromatic adaptation to an ICC workflow in accordance with an embodiment of the present invention.

Turning to FIG. 2, a flow diagram is illustrated which shows a method 200 for providing consistent chromatic adaptation for a workflow of ICC profiles in accordance with an embodiment of the present invention. Initially, given a workflow that contains a sequence of ICC profiles, the profiles that require chromatic adaptation using the present invention are identified, as shown at block 202. Generally, profiles that require chromatic adaptation are ones in which some chromatic adaptation method is contained within the profile. A profile may designated as requiring chromatic adaptation using the present invention if it has a viewing condition tag in which the normalized device source illuminant (i.e. the device source white point) is different from the PCS white point in the profile header. In addition, a profile having a chad tag may also be designated as requiring chromatic adaptation.

Figure 3:
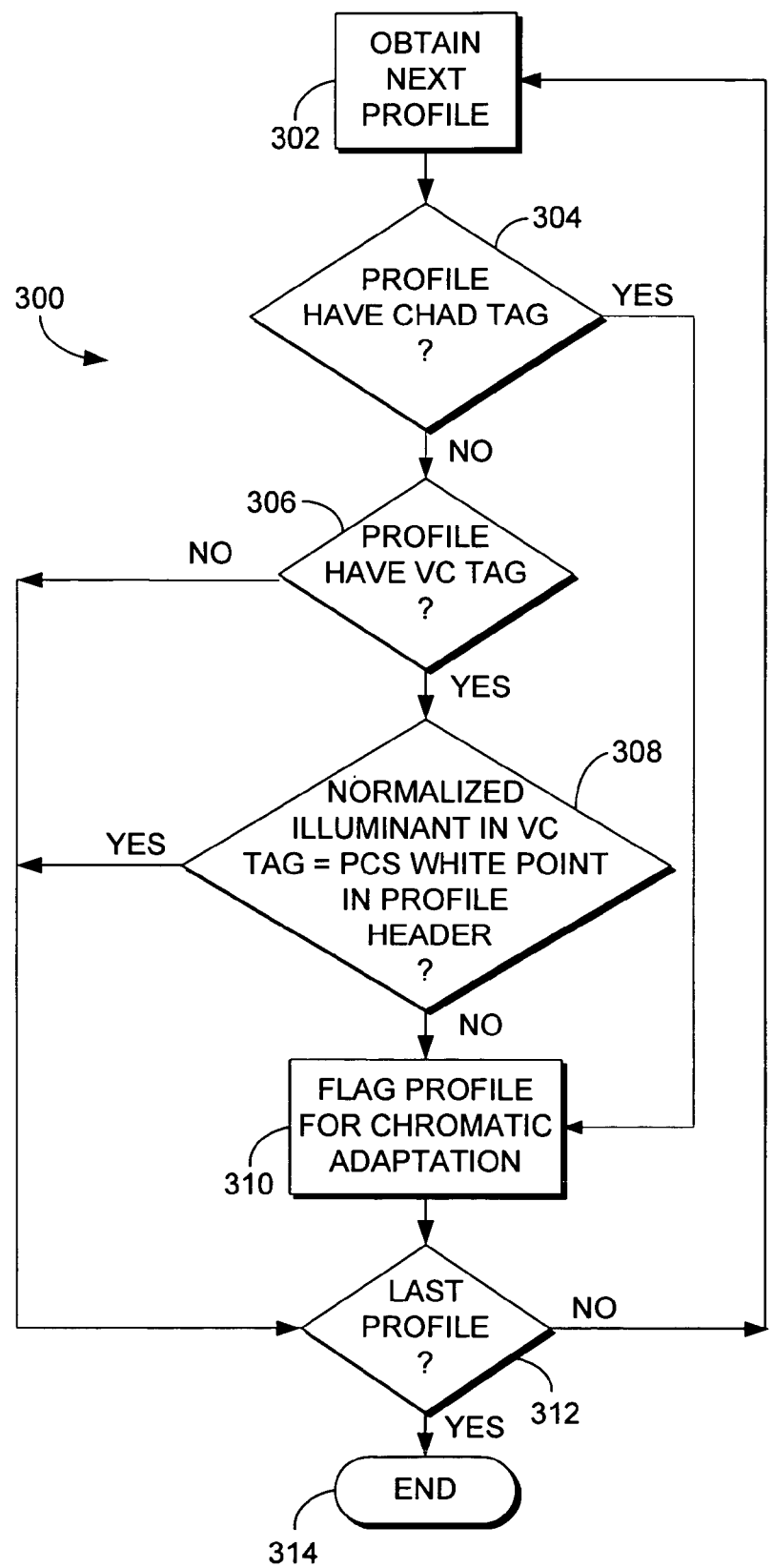
FIG. 3 is a flow diagram showing a method for determining ICC profiles that require chromatic adaptation in accordance with an embodiment of the present invention.

A method 300 for determining which profiles within a workflow require chromatic adaptation in accordance with an embodiment of the present invention is shown in FIG. 3. A profile within the sequence is obtained initially, as shown at block 302. Whether the current profile contains a chad tag is determined at block 304. If the current profile has a chad tag, the profile will be designated as requiring chromatic adaptation. The profile is flagged for chromatic adaptation at block 310. After flagging the current profile for chromatic adaptation, whether the profile is the last profile is determined at block 312. The next profile is obtained if the current profile is not the last profile.

Alternatively, if the current profile does not have a chad tag, whether the profile contains a viewing condition tag is determined at block 306. If the current profile does not have a viewing conditions tag, the profile will not require chromatic adaptation. The next profile will then be obtained if the current profile is not the last profile as determined at block 312. If the current profile does contain a viewing conditions tag at block 306, whether the device source illuminant in the viewing conditions tag is different from the PCS white point in the profile header is determined at block 308. Because the device source illuminant in the viewing conditions tag is contained in absolute XYZ values while the PCS white point is contained in relative XYZ values, the device source illuminant must be normalized before comparison. If the normalized device source illuminant is the same as the PCS white point, no chromatic adaptation is necessary and the next profile is obtained if the current profile is not the last profile in the sequence. However, if the normalized device source illuminant differs from the PCS white point, the profile requires chromatic adaptation. The profile is then flagged for chromatic adaptation at block 310. After flagging the current profile for chromatic adaptation, whether the profile is the last profile is determined at block 312. The next profile is obtained if the current profile is not the last profile. Otherwise, all profiles in the sequence have been examined to identify the profiles that require chromatic adaptation and the process ends at block 314.

Referring again to FIG. 2, after determining and flagging the profiles that require chromatic adaptation, a control profile is identified at block 204. The chromatic adaptation method of the control profile will be designated as the chromatic adaptation method to be applied to each of the profiles in the sequence identified in block 204 as requiring chromatic adaptation. In doing so, the present invention provides a workflow having consistent chromatic adaptation based on the chromatic adaptation technique of the control profile.

The selection of the control profile may be performed by a number of methods within the scope of the present invention. By way of example and not limitation, in one embodiment, the last profile in the sequence that is considered suitable for constructing a chromatic adaptation matrix for each profile requiring chromatic adaptation is selected as the control profile. A profile may be considered suitable for constructing a chromatic adaptation matrix for each profile within the scope of the present invention in a number of ways. In one embodiment, a profile is considered suitable if it contains a viewing conditions tag, regardless of whether the normalized device source illuminant differs from the PCS white point in the profile header. In another embodiment, a flag in the profile header may be used to designate whether the profile should be considered suitable for constructing a chromatic adaptation matrix. A profile author then has the option to set the flag when constructing the profile to indicate the intention to use a method for chromatic adaptation in accordance with the present invention. In a further embodiment, only profiles intended for a particular color management engine may be considered suitable for constructing a chromatic adaptation matrix. Profile headers contain information indicating the preferred color management engine for processing the profile. A profile may be considered suitable then only if a particular color management engine is indicated. In yet another embodiment, any profile containing a chad tag may be considered suitable for constructing a chromatic adaptation matrix.

In some embodiments of the present invention, profiles that employ the same chromatic adaptation method as the control profile may be determined. These profiles will not require chromatic adaptation in accordance with the present invention as these profiles already include a consistent chromatic adaptation method. For example, after determining the control profile, profiles previously flagged for chromatic adaptation may be compared with the control profile and those profiles having the same chromatic adaptation method may have the flag removed. In some embodiments, the control profile may be determined before profiles requiring chromatic adaptation are identified. The identification of profiles requiring chromatic adaptation may then include comparing the profiles with the control profile such that profiles having a chromatic adaptation method consistent with the control profile are not flagged.

Figure 4:
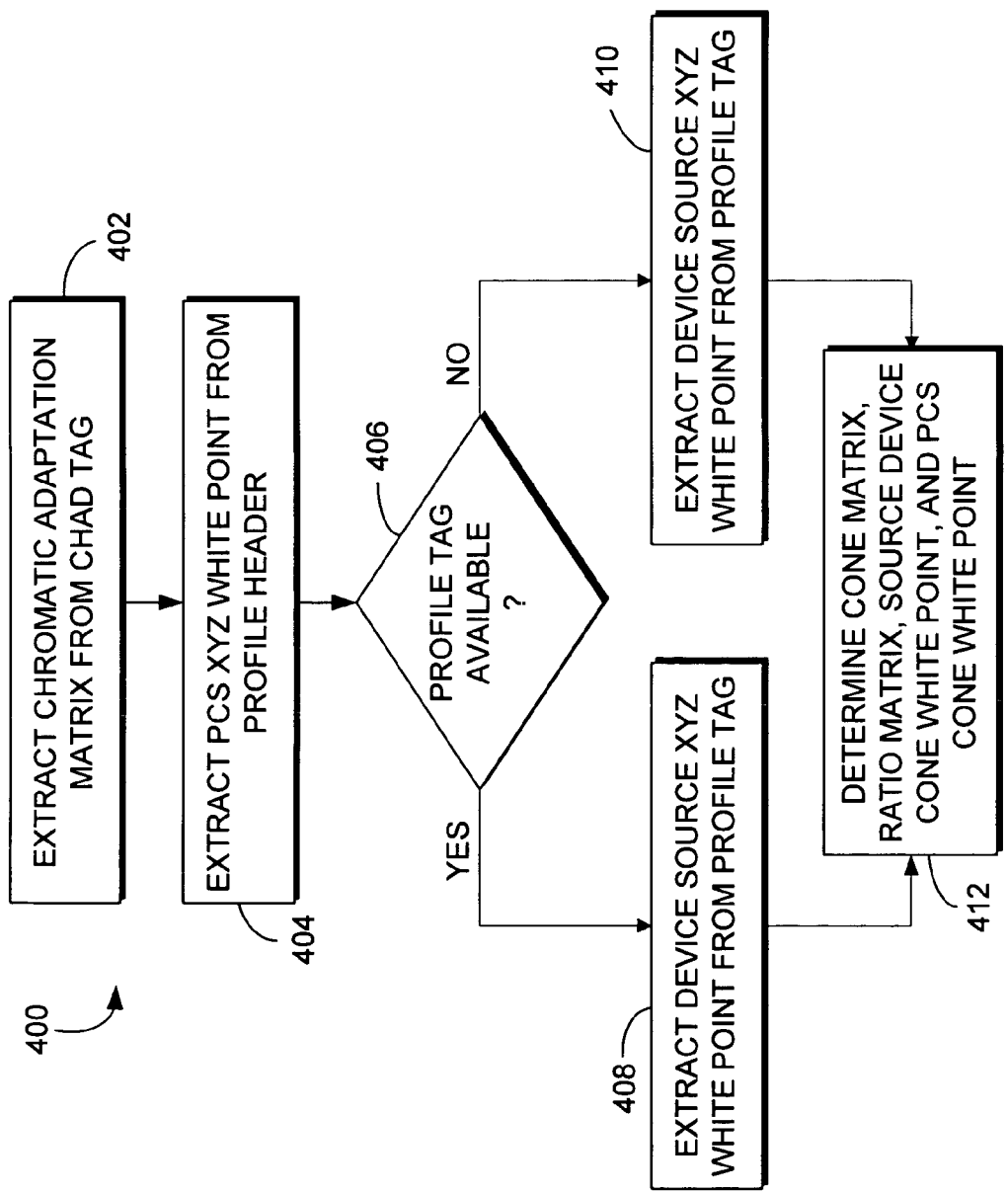
FIG. 4 is a flow diagram showing a method for extracting the cone matrix, ratio matrix, and cone white points for a profile in accordance with an embodiment of the present invention.

After identifying the control profile, the parameters required to construct a chromatic adaptation matrix for each profile are extracted from the control profile, as shown at block 206. In particular, these parameters include a target cone matrix and target cone white points. A method 400 for extracting the cone matrix and cone white points from a profile in accordance with an embodiment of the present invention is shown in FIG. 4. Because these parameters are not expressly set forth in the control profile, they must be derived from other parameters that are expressly set forth: the chromatic adaptation matrix, the PCS XYZ white point, and the device source XYZ white point (if included in the profile). Initially, the chromatic adaptation matrix is extracted from the control profile's chad tag, as shown at block 402. The PCS XYZ white point is then extracted from the profile header at block 404. Whether the profile has a tag from which the device source XYZ white point may be extracted is next determined at block 406. For example, the device source XYZ white point may extracted from the viewing conditions tag, the medium tag, or the measurement tag. If such a tag is present in the profile, the device source XYZ white point is extracted from the tag, as shown at block 408. Alternatively, if the profile does not have a tag from which the device source XYZ white point can be extracted, the device source XYZ white may be determined by applying the inverted chromatic adaptation matrix to the PCS XYZ white point at block 410.

The chromatic adaptation matrix is comprised of two matrices: a cone matrix and a ratio matrix. However, the chad tag within a profile sets forth only the chromatic adaptation matrix and does not specify these constituent matrices. Therefore, these matrices must be determined. In addition, because the device source cone white point and the PCS cone white point are not provided in the profile, these parameters must likewise be determined. Therefore, at block 412, the cone matrix, ratio matrix, and cone white points are determined using the previously determined chromatic adaptation matrix, PCS XYZ white point, and device source white point for the profile.

Figure 5:
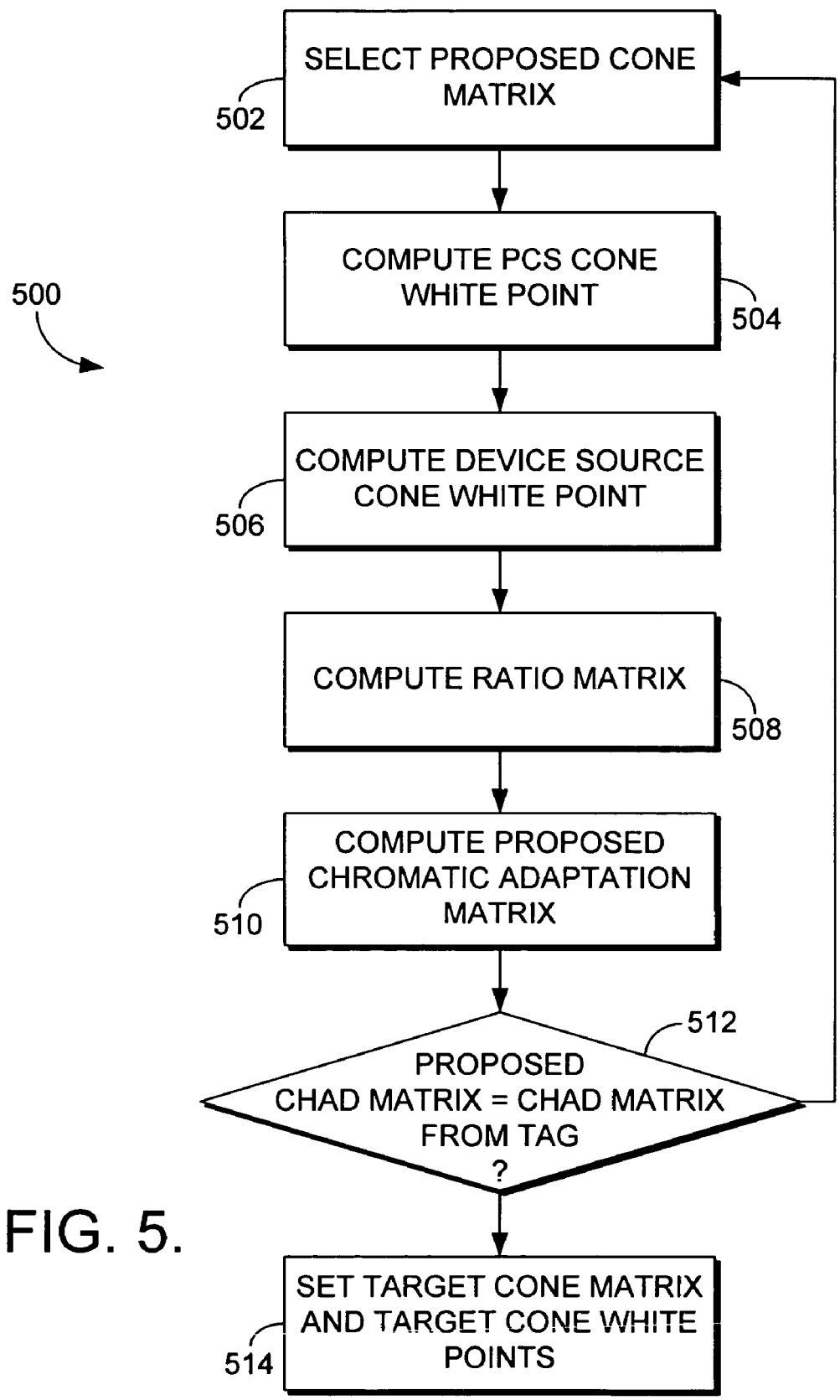
FIG. 5 is a flow diagram showing an iterative method for determining the cone matrix, ratio matrix, and cone white points for a profile in accordance with an embodiment of the present invention.

In one embodiment, sophisticated regression methods, such as Newton-Raphson or Marquardt may be employed to calculate the cone matrix, ratio matrix, and cone white points. In another embodiment, such as that shown in the method 500 of FIG. 5, the matrices and cone white points are determined by iteratively selecting a proposed cone matrix, computing a proposed chromatic adaptation matrix, and comparing the proposed chromatic adaptation matrix with the chromatic adaptation matrix in the chad tag until the matrices match. By way of example and not limitation, the process may include looping through a known set of cone matrices, such as the Bradford matrix, the "Wrong Von Kries" matrix, the CIELAB matrix, or some other known or selected matrix. In accordance with such an embodiment, an initial proposed cone matrix is selected at block 502. At block 504, the PCS cone white point is computed using the PCS XYZ white point (which was previously extracted from the profile header) and the proposed cone matrix according to the following equation:

$$\begin{bmatrix} \rho_{WPpcs} \\ \gamma_{WPpcs} \\ \beta_{WPpcs} \end{bmatrix} = M_{cone} \begin{bmatrix} X_{WPpcs} \\ Y_{WPpcs} \\ Z_{WPpcs} \end{bmatrix}$$

wherein $\rho\gamma\beta_{WPPCS}$ represents the PCS cone white point, $M_{cone}$ represents the cone matrix, and $XYZ_{WWPPCS}$ represents the PCS XYZ white point.

Next, at block 506, the cone white point for the device source is computed using the device source XYZ white point (which was previously extracted from the viewing conditions tag, medium tag, or the measurement tag or computed using the inverted chromatic adaptation matrix) and the proposed cone matrix according to the following equation:

$$\begin{bmatrix} \rho_{WPsrc} \\ \gamma_{WPsrc} \\ \beta_{WPsrc} \end{bmatrix} = M_{cone} \begin{bmatrix} X_{WPsrc} \\ Y_{WPsrc} \\ Z_{WPsrc} \end{bmatrix}$$

wherein $\rho\gamma\beta_{WPsrc}$ represents the device source cone white point, $M_{cone}$ represents the cone matrix, and $XYZ_{WPsrx}$ represents the device source XYZ white point.

After the PCS cone white point and the device source cone white point have been determined, the ratio matrix is computed at block 508 according to the following equation:

$$M_{ratio} = \begin{bmatrix} \rho_{WPpcs}/\rho_{WPsrc} & 0 & 0 \\ 0 & \gamma_{WPpcs}/\gamma_{WPsrc} & 0 \\ 0 & 0 & \beta_{WPpcs}/\beta_{WPsrc} \end{bmatrix}$$

wherein $M_{ratio}$ represents the ratio matrix.

Using the ratio matrix, $M_{ratio}$, computed at block 508 and the proposed cone matrix, $M_{cone}$, selected at block 502, a proposed chromatic adaptation matrix, $M_{adapt}$, is computed at block 510 using the following equation:

$$M_{adapt} = M_{cone}^{-1} M_{ratio} M_{cone}$$

The proposed chromatic adaptation matrix computed at block 510 is then compared with the chromatic adaptation matrix extracted from the chad tag at block 402, as shown at block 512. If the proposed chromatic adaptation matrix matches the chromatic adaptation matrix from the chad tag, the proposed cone matrix is set as the target cone matrix, as shown at block 514. In addition, the cone white points computed using that proposed cone matrix are set as the target cone white points. If the proposed chromatic adaptation matrix does not match the chromatic adaptation matrix from the chad tag at block 512, the process of selecting a proposed cone matrix at block 502 through comparing a computed proposed chromatic adaptation matrix with the chad tag's chromatic adaptation matrix at block 512 is repeated until an appropriate proposed cone matrix is selected.

Once the target cone matrix and target cone white points from the control profile have been identified, the color data associated with the other profiles requiring chromatic adaptation may be converted. Referring again to FIG. 2, all V4 profiles that were tagged as requiring chromatic adaptation are identified at block 208. Each profile header has a version attribute that allows V4 profiles to be identified. The color data for each of these V4 profiles is then converted at block 210 such that the same chromatic adaptation method used for the control profile is applied to the data corresponding to these V4 profiles.

Figure 6:
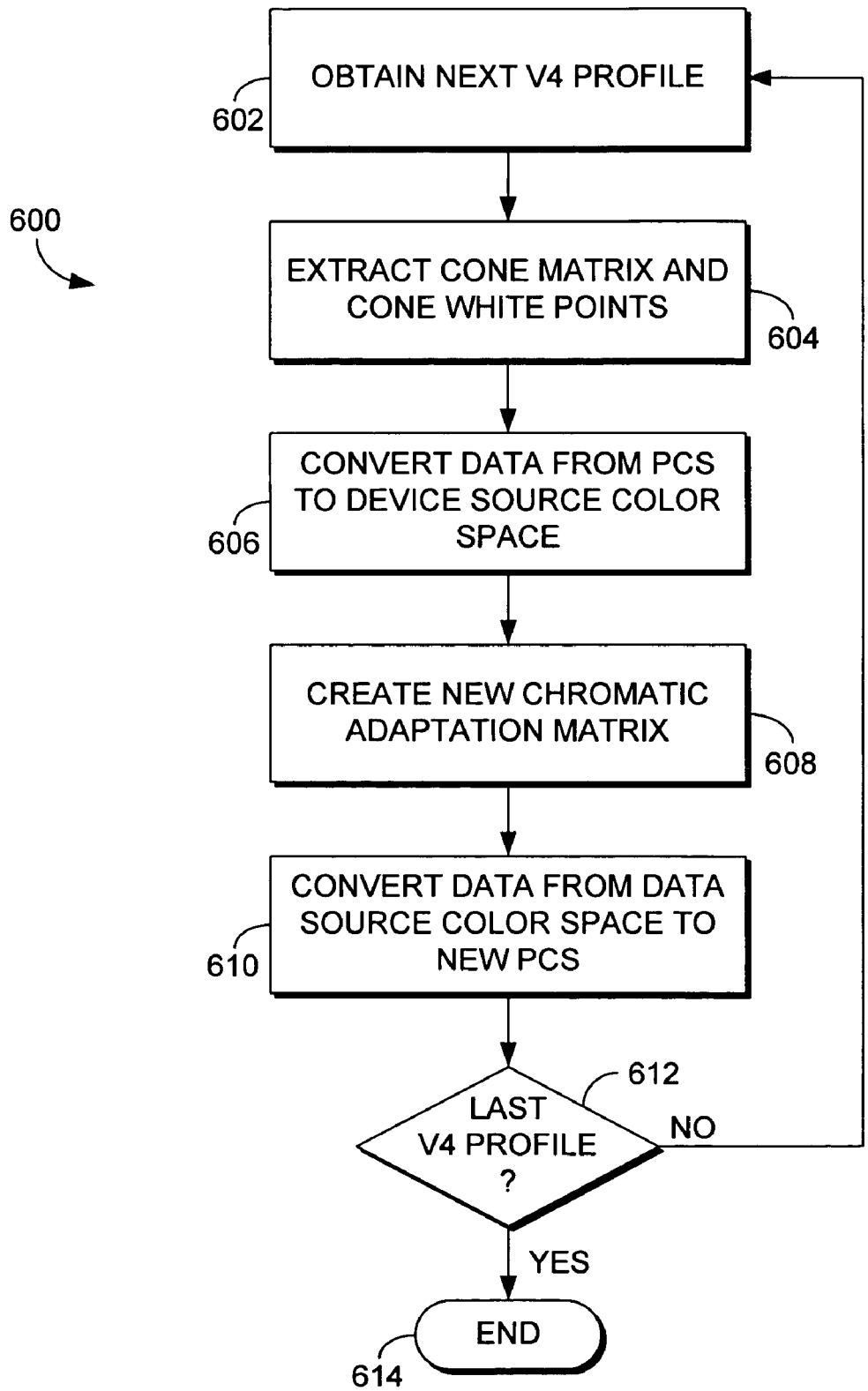
FIG. 6 is a flow diagram showing a method for converting color data for V4 profiles within an ICC workflow that have been identified as requiring chromatic adaptation in accordance with an embodiment of the present invention.

FIG. 6 illustrates a method 600 for converting color data for a V4 profile in accordance with an embodiment of the present invention. An initial V4 profile is obtained, as shown at block 602. The cone matrix and cone white points are extracted for the current V4 profile at block 604. A method such as method 400 described with reference to FIG. 4 may be employed to determine the cone matrix and cone white points. Because the color data for the V4 profile has been chromatically adapted to the PCS using a different chromatic adaptation method, that adaptation is undone by converting the color data from the PCS to the device source color space, as shown at block 606. This may be accomplished by applying the inverse chromatic adaptation matrix (from the current V4 profile's chad tag) to the PCS color data.

At block 608, a new chromatic adaptation matrix is computed using the V4 profile's device source cone white point, the target PCS cone white point, and the target cone matrix. Accordingly, the new chromatic adaptation matrix employs the chromatic adaptation method of the control profile. The current V4 profile's color data, which has already been converted from the PCS to the device source color space at block 606, is then converted from the device source color space to the PCS using the new chromatic adaptation matrix, as shown at block 610. Accordingly, the data for the current V4 profile is now contained in the PCS having been chromatically adapted using the same method as the control profile. At block 612, whether the current V4 profile is the last V4 profile identified as requiring chromatic adaptation is determined. If the current V4 profile is not the last V4 profile, the process is repeated until the color data for the last V4 profile in the workflow has been converted and the process ends at block 614.

Turning again to FIG. 2, after the color data for all V4 profiles requiring chromatic adaptation has been converted, the V2 profiles that have been flagged as requiring chromatic adaptation are identified, as shown at block 212. The V2 profiles are identified by the profile version attribute in the profile header. The data for each V2 profile identified is then converted at block 214 such that the same chromatic adaptation method used for the control profile is applied to the color data corresponding to these V2 profiles.

Figure 7:
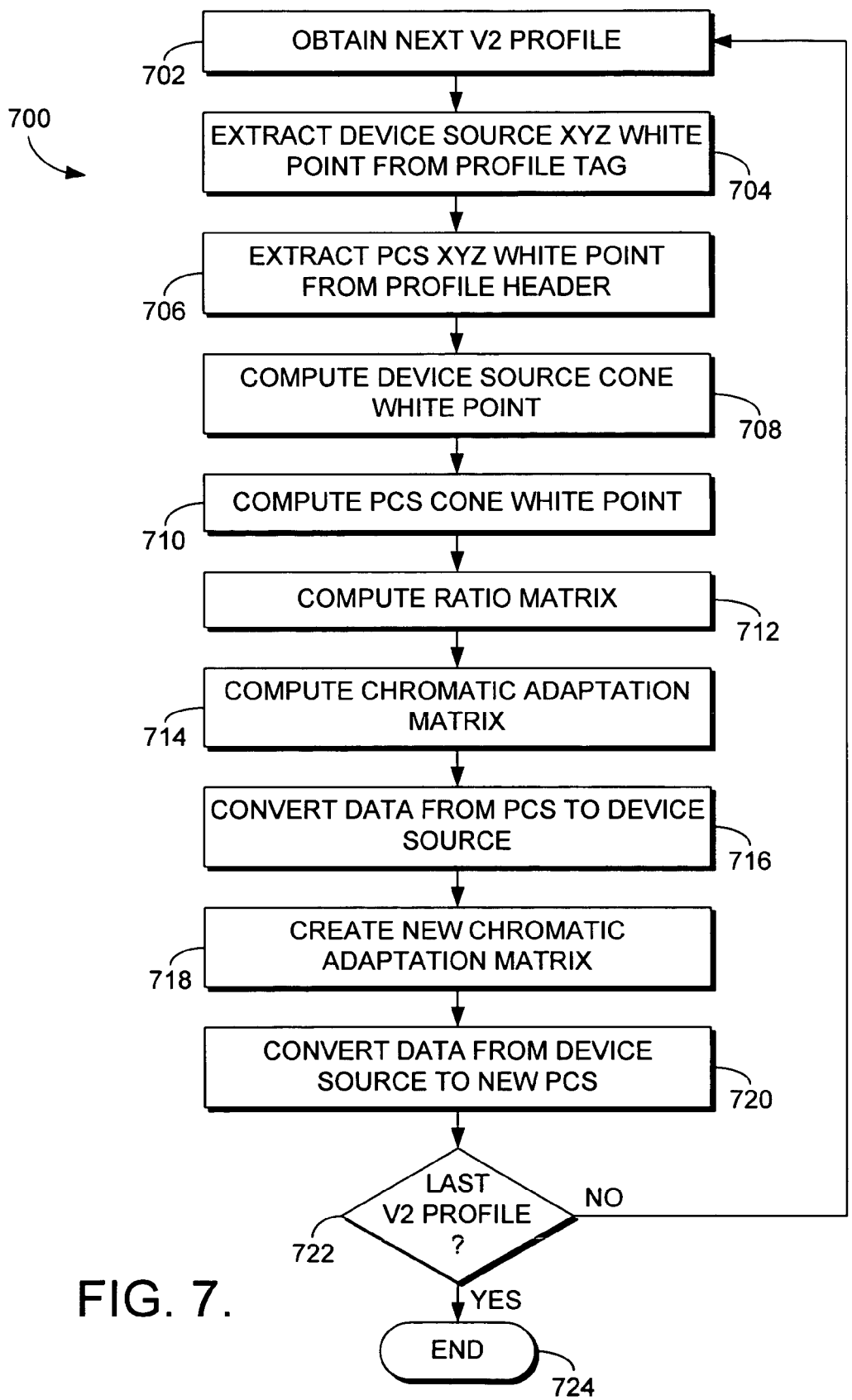
FIG. 7 is a flow diagram showing a method for converting color data for V2 profiles within an ICC workflow that have been identified as requiring chromatic adaptation in accordance with an embodiment of the present invention.

FIG. 7 illustrates a method 700 for converting data for V2 profiles in accordance with an embodiment of the present invention. An initial V2 profile is obtained at block 702. As shown at block 704, the device source XYZ white point is extracted (in preference priority) from the viewing conditions tag, the medium tag, or the measurement tag. The PCS white point is extracted from the profile header at block 706. Because V2 profiles do not contain a chad tag, the chromatic adaptation matrix used by the profile is not available. Therefore, V2 profiles are assumed to use the Bradford matrix as the cone matrix within each profile's chromatic adaptation matrix. Using the Bradford matrix, the device source cone white point is computed at block 708. The PCS cone white point is also computed using the Bradford matrix at block 710. The ratio matrix is computed using the computed device source cone white point and the computed PCS cone white point, as shown at block 712. Using the ratio matrix and the Bradford matrix, a chromatic adaptation matrix is computer at block 714. The inverse of this chromatic adaptation matrix is used to convert the PCS data for the current V2 profile to the device source color space at block 716. At block 718, a new chromatic adaptation matrix is computed using the computed device source cone white point, the target cone matrix, and the target PCS cone white point. The new chromatic adaptation matrix is then applied to the device source color data to convert the data to the PCS at block 720. Whether the current V2 profile is the last V2 profile identified as requiring chromatic adaptation is determined at block 722, and the process is repeated until the color data for the last V2 profile is converted and the process ends at block 724.

Referring back to FIG. 2, once the color data for each profile requiring chromatic adaptation has been converted such that the color data associated with all profiles have a homogeneous chromatic adaptation that is based on the chromatic adaptation contained in the control profile, a transform is created using the new profile data, as shown at block 216. A number of methods may be employed for creating the transform within the scope of the present invention. By way of example only and not limitation, a uniformly sampled multi-dimensional table may be created and used with each profile to derive a resulting optimized transform. One skilled in the art will recognize the plethora of methods for deriving a transform that may be employed.

As can be understood, embodiments of the present invention provide systems and methods for providing consistent chromatic adaptation to an ICC workflow. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable storage media having computer-useable instructions embodied thereon that, when used, enable a computing device to perform a method for providing consistent chromatic adaptation for a workflow comprising a sequence of a plurality of International Color Consortium (ICC) profiles, each ICC profile comprising a profile header and a plurality of tags, the method comprising:

identifying one of the plurality of ICC profiles as a control profile to define a standard chromatic adaptation method for use in conversion of color data of one or more of the plurality of ICC profiles, the control profile requiring chromatic adaptation;

determining a chromatic adaptation method employed by the control profile, wherein said determining includes extracting a chromatic adaptation matrix from a chad tag within the control profile;

extracting a profile connection space (PCS) XYZ white point from the profile header of the control profile;

determining whether the control profile has a tag from which a device source XYZ white point may be extracted;

if the control has a tag from which a device source XYZ white point may be extracted, extracting the device source XYZ white point from the tag within the control profile;

if the control profile does not have a tag from which a device source XYZ white point may be extracted, determining the device source XYZ white point using the chromatic adaptation matrix and the PCS XYZ white point; and determining a target cone matrix and target cone white points from the control profile using the chromatic adaptation matrix, the PCS XYZ white point, and the device source XYZ white point, the target cone white points comprising a target PCS cone white point and a target device source cone white point;

identifying ICC profiles within the workflow that require chromatic adaptation; and converting color data associated with each ICC profile identified as requiring chromatic adaptation using the chromatic adaptation method employed by the control profile.

2. The media of claim 1, wherein identifying ICC profiles within the workflow that require chromatic adaptation comprises at least one of:

identifying ICC profiles that have a viewing condition tag, wherein the viewing condition tag has a device source illuminant value that when normalized differs from a PCS white point value in the profile header; and identifying ICC profiles that have a chad tag.

3. The media of claim 1, wherein identifying ICC profiles within the workflow that require chromatic adaptation further comprises:

determining ICC profiles that include the chromatic adaptation method employed by the control profile.

4. The media of claim 1, wherein the ICC profiles that include the chromatic adaptation method employed by the control profile are not included as ICC profiles identified as requiring chromatic adaptation.

5. The media of claim 1, wherein identifying one of the plurality of ICC profiles as a control profile comprises at least one of:

identifying the last ICC profile in the sequence of the plurality of ICC profiles that contains a viewing conditions tag;

identifying the last ICC profile in the sequence of the plurality of ICC profiles that has a flag set in the profile header that indicates that the ICC profile is suitable for use as a control profile;

identifying the last ICC profile in the sequence of the plurality of ICC profiles that has a predetermined color management engine indicated as a preferred color management engine in the profile header; and identifying the last ICC profile in the sequence of the plurality of ICC profiles that contains a chad tag.

6. The media of claim 1, wherein converting color data associated with each ICC profile identified as requiring chromatic adaptation using the chromatic adaptation method employed by the control profile comprises:

converting color data for each ICC profile identified as requiring chromatic adaptation using a target cone matrix and a target PCS cone white point from the control profile.

7. The media of claim 1, wherein converting color data for each ICC profile identified as requiring chromatic adaptation comprises using a target cone matrix and a target PCS cone white point from the control profile comprises:

iteratively repeating:
selecting an ICC profile identified as requiring chromatic adaptation;

determining a cone matrix and cone white points for the ICC profile, the cone white points comprising a PCS cone white point and a device source cone white point;

converting color data associated with the ICC profile from a PCS to a device source color space;

computing a new chromatic adaptation matrix using the target cone matrix, the target PCS cone matrix, and the device source cone white point for the ICC profile; and converting the color data associated with the ICC profile from the device source color space to the PCS using the new chromatic adaptation matrix;

until the data for each ICC profile identified as requiring chromatic adaptation has been converted.

8. The media of claim 1, wherein converting color data associated with the ICC profile from a PCS to a device source color space comprises:

applying the inverse of a chromatic adaptation matrix from a chad tag within the ICC profile to the color data.

9. The media of claim 1, wherein converting color data associated with each ICC profile identified as requiring chromatic adaptation using the chromatic adaptation method employed by the control profile comprises:

iteratively repeating:
selecting an ICC profile identified as requiring chromatic adaptation;

reversing a chromatic adaptation previously applied to color data associated with the ICC profile; and applying a new chromatic adaptation to color data associated with the ICC profile using a chromatic adaptation matrix computed based on the chromatic adaptation method of the control profile, until the color data for each ICC profile identified as requiring chromatic adaptation has been converted.

10. A computer system for providing consistent chromatic adaptation for a workflow comprising a sequence of a plurality of International Color Consortium (ICC) profiles, each ICC profile comprising a profile header and a plurality of tags, the system comprising:

a profile identifying component for identifying ICC profiles within the workflow that require chromatic adaptation;

a control profile identifying component for identifying one of the plurality of ICC profiles that require chromatic adaptation as a control profile;

a target determining component for determining a target cone matrix and target cone white points from the control profile, the target cone white points comprising a target profile connection space (PCS) cone white point and a target device source cone white point, wherein the target determining component determines a target cone matrix and target cone white points from the control profile by extracting a chromatic adaptation matrix from a chad tag within the control profile;

extracting a PCS XYZ white point from the profile header of the control profile;

determining whether the control profile has a tag from which a device source XYZ white point may be extracted;

if the control has a tag from which a device source XYZ white point may be extracted, extracting the device source XYZ white point from the tag within the control profile;

if the control profile does not have a tag from which a device source XYZ white point may be extracted, determining the device source XYZ white point using the chromatic adaptation matrix and the PCS XYZ white point; and determining the target cone matrix and target cone white points using the chromatic adaptation matrix, the PCS XYZ white point, and the device source XYZ white point; and a conversion component for converting color data for each ICC profile identified as requiring chromatic adaptation using the target cone matrix and target PCS cone white point, wherein said converting comprises reversing a chromatic adaptation previously applied to color data associated with each ICC profile identified as requiring chromatic adaptation, and applying a new chromatic adaptation to color data associated with each ICC profile identified as requiring chromatic adaptation using a chromatic adaptation matrix computed based on the target cone matrix and target cone white points from the control profile.

11. The system of claim 10, wherein the profile identifying component identifies ICC profiles within the workflow that require chromatic adaptation by at least one of:

identifying ICC profiles that have a viewing condition tag, wherein the viewing condition tag has a device source illuminant value that when normalized differs from a PCS white point value in the profile header; and identifying ICC profiles that have a chad tag.

12. The system of claim 6, wherein the control profile identifying component identifies one of the plurality of ICC profiles as a control profile by at least one of:

identifying the last ICC profile in the sequence of the plurality of ICC profiles that contains a viewing conditions tag, identifying the last ICC profile in the sequence of the plurality of ICC profiles that has a flag set in the profile header that indicates that the ICC profile is suitable for use as a control profile, and identifying the last ICC profile in the sequence of the plurality of ICC profiles that has a predetermined color management engine indicated as a preferred color management engine in the profile header.

13. The system of claim 10, wherein the conversion component converts color data for each ICC profile identified as requiring chromatic adaptation by:

iteratively repeating:
selecting a profile identified as requiring chromatic adaptation;
determining a cone matrix and cone white points for the profile, the cone white points comprising a PCS cone white point and a device source cone white point;
converting color data associated with the ICC profile from a PCS to a device source color space;
computing a new chromatic adaptation matrix using the target cone matrix, the target PCS cone matrix, and the device source cone white point for the ICC profile; and
converting the color data associated with the ICC profile from the device source color space to the PCS using the new chromatic adaptation matrix;
until the data for each ICC profile identified as requiring chromatic adaptation has been converted.

14. One or more computer-readable storage media having computer-useable instructions embodied thereon for performing a method for providing consistent chromatic adaptation for a workflow comprising a sequence of a plurality of International Color Consortium (ICC) profiles, each ICC profile comprising a profile header and a plurality of tags, the method comprising:

identifying one of the plurality of ICC profiles as a control profile to define a standard chromatic adaptation method for use in conversion of color data of one or more of the plurality of ICC profiles;

determining a chromatic adaptation method employed by the control profile, wherein determining a chromatic adaptation method includes, extracting a chromatic adaptation matrix from a chad tag within the control profile, extracting a profile connection space (PCS) XYZ white point from the profile header of the control profile, determining whether the control profile has a tag from which a device source XYZ white point may be extracted, if the control has a tag from which a device source XYZ white point may be extracted, extracting the device source XYZ white point from the tag within the control profile, if the control profile does not have a tag from which a device source XYZ white point may be extracted, determining the device source XYZ white point using the chromatic adaptation matrix and the PCS XYZ white point, and determining a target cone matrix and target cone white points using the chromatic adaptation matrix, the PCS XYZ white point, and the device source XYZ white point, the target cone white points comprising a target PCS cone white point and a target device source cone white point;

identifying ICC profiles within the workflow that require chromatic adaptation; and converting color data associated with each ICC profile identified as requiring chromatic adaptation using the chromatic adaptation method employed by the control profile, wherein said converting comprises reversing a chromatic adaptation previously applied to color data associated with each ICC profile identified as requiring chromatic adaptation, and applying a new chromatic adaptation to color data associated with each ICC profile identified as requiring chromatic adaptation using a chromatic adaptation matrix computed based on the chromatic adaptation method of the control profile.

15. The media of claim 14, wherein extracting a device source XYZ white point comprises extracting the device source XYZ white point from a viewing conditions tag within the control profile.

16. The media of claim 14, wherein determining the target cone matrix and target cone white points comprises employing a regression method.

17. The media of claim 14, wherein determining the target cone matrix and target cone white points comprises:

iteratively repeating:
selecting a proposed cone matrix;
computing a PCS cone white point using the proposed cone matrix and the PCS XYZ white point;

computing a device source cone white point using the proposed cone matrix and the device source XYZ white point;

computing a ratio matrix using the PCS cone white point and the device source cone white point;

computing a proposed chromatic adaptation matrix using the proposed cone matrix and ratio matrix; and comparing the proposed chromatic adaptation matrix and the chromatic adaptation matrix from the chad tag within the control profile;

until the proposed chromatic adaptation matrix matches the chromatic adaptation matrix from the chad tag within the control profile.

* * * * *

UNITED STATES PATENT AND TRADEMARK OFFICE
CERTIFICATE OF CORRECTION

| | | |
|---|---|---|
| PATENT NO. | : 7,605,823 B2 | Page 1 of 1 |
| APPLICATION NO. | : 11/159731 | |
| DATED | : October 20, 2009 | |
| INVENTOR(S) | : Stokes et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this

Fifth Day of October, 2010

David J. Kappos
*Director of the United States Patent and Trademark Office*